Aug. 31, 1965    W. A. ROBINSON    3,204,105
INFRARED DETECTOR USING A RAMAN SCATTERING MEDIUM
Filed Jan. 23, 1961

WESLEY A. ROBINSON
INVENTOR

BY Albert Rosen

ATTORNEY.

United States Patent Office 3,204,105
Patented Aug. 31, 1965

3,204,105
INFRARED DETECTOR USING A RAMAN SCATTERING MEDIUM
Wesley A. Robinson, El Segundo, Calif., assignor, by mesne assignments, to Thompson Ramo Wooldridge Inc., Cleveland, Ohio, a corporation of Ohio
Filed Jan. 23, 1961, Ser. No. 84,233
23 Claims. (Cl. 250—211)

This invention relates to the electromagnetic radiation amplification art and, more particularly, to improved methods of and arrangements for measuring the intensity of preselected frequencies of electromagnetic radiation.

The intensity of certain frequencies of electromagnetic radiation has been, in the past, generally difficult to measure. In particular, arrangements for measuring the intensity of electromagnetic radiation in the infrared portion of the spectrum have not always been as sensitive as may be desired and for some of the lower infrared frequencies there are, at present, only comparatively insensitive intensity measuring devices. Thus, while lead sulphide, lead telluride, and other materials have been utilized in the past for measuring the intensity of the comparatively higher infrared frequencies, and thermocouples and thermopiles for measuring these and lower infrared frequencies, such arrangements have not provided the desired highly sensitive indication of intensity. In contrast, for electromagnetic radiation in the visible portion of the electromagnetic radiation spectrum, comparatively high detection efficiency is realized, and very sensitive detectors, such as solar cells and photomultipliers, are available.

Accordingly, it is an object of this invention to provide an improved method of and means for detecting the intensity of preselected frequencies of electromagnetic radiation.

It is another object of this invention to provide improved methods of and means for measuring the intensity of infrared radiation.

It is yet another object of this invention to provide improved methods of and means for converting variations in the intensity of electromagnetic radiation in one portion of the electromagnetic spectrum to corresponding variations in intensity of electromagnetic radiation in another, and more easily measurable, portion of the electromagnetic radiation spectrum.

The foregoing and related objects are realized according to this invention by first inducing a virtual absorption of photons, associated with a preselected frequency of electromagnetic radiation, by a Raman scattering medium and then detecting the intensity of the anti-Stokes line in the electromagnetic radiation that is emitted from the Raman scattering medium. As used herein, a Raman scattering medium is defined as a collection of similar molecules which have a known, preselected frequency associated with a quantum energy transition between two preselected quantum energy states of the molecules. The virtual absorption of the photons by molecules in the higher of the two energy states results in emission of electromagnetic radiation from the molecules at the anti-Stokes frequency; this emission occurs as the molecules collapse to the lower of the two energy states.

In one embodiment of this invention, where it is desired to measure the intensity of a particular frequency of, for example, infrared radiation, a Raman scattering medium is selected that has a particular quantum energy separation between the ground quantum energy state and a first excited state. This quantum energy separation corresponds to the frequency of the infrared radiation to be measured. The Raman scattering medium is exposed to the infrared radiation and this radiation induces, at least intermittently, a non-thermal equilibrium population distribution between the ground quantum energy state and the first excited state; this exposure results in an overpopulation of molecules in the first excited state. A beam of electromagnetic radiation, preferably monochromatic or narrow band, which for example may be in the visible portion of the electromagnetic radiation spectrum, is directed to traverse the Raman scattering medium in a preselected direction. During this traversal one of the possible interactions, between the photons associated with the visible radiation and the molecules of the Raman scattering medium that are in the first excited state, is a virtual absorption of the photons by the molecules. The photon absorbing molecule subsequently collapses down to the ground state and thereby emits electromagnetic radiation at a frequency slightly greater than the visible frequency. The difference in frequency is an amount equivalent to the energy separation between the ground quantum energy state and the first excited state. (This frequency difference, as stated above, is equivalent to the frequency of the infrared radiation that is to be measured.) This frequency emitted from the molecules is termed the anti-Stokes line. The intensity of this anti-Stokes line depends on the number of molecules of the Raman spectra that are in the first excited state and are thus available for the virtual absorption of photons. Thus, the intensity of the anti-Stokes line is proportional to the intensity of the incident infrared radiation which increases the number of molecules at the first excited state. Since the anti-Stokes line, in this example, is also in the visible portion of the electromagnetic radiation spectrum, a sensitive detector, such as a solar cell, photo multiplier, or the like, is utilized to detect the intensity of the anti-Stokes line. Thus, the measurement of the intensity of the anti-Stokes line provides a measurement of the intensity of the incident infrared radiation.

In another embodiment of this invention wherein it is desired to measure the intensity of a preselected bandwidth of infrared radiation rather than a single frequency, a Raman scattering medium is selected that has a band quantum energy separation between the molecules at the ground energy state and a first excited state. The band quantum energy separation corresponds to the infrared bandwidth to be measured. Upon the molecules collapse to the ground state from the first excited state, associated with a virtual absorption of visible photons, there is an emission of an anti-Stokes band having an intensity proportional to the infrared bandwidth intensity. Detection of the intensity of the anti-Stokes band provides a measure of the intensity of the incident infrared bandwidth.

The invention is explained in greater detail in the following specification taken together with the accompanying drawings, wherein like reference characters refer to similar elements throughout, and in which.

Figure 1:
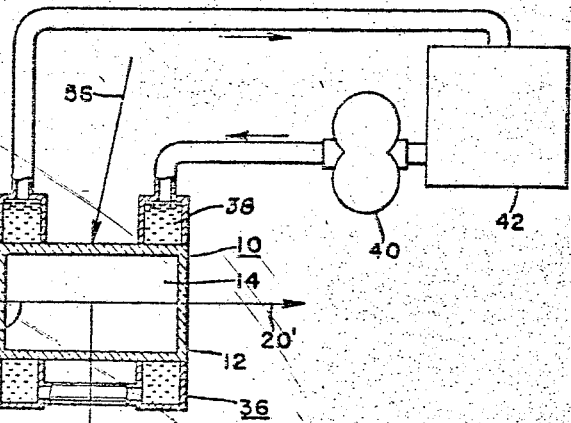
FIGURE 1 illustrates the apparatus associated with one embodiment of this invention.
Figure 1:
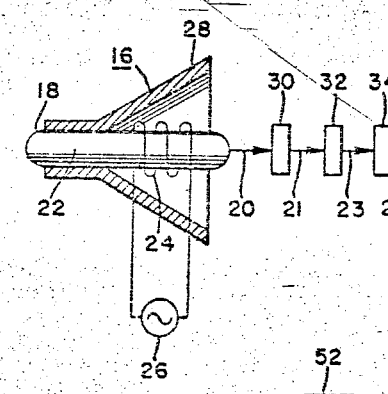

Referring now to FIGURE 1, there is shown an arrangement for measuring the intensity of a preselected frequency of electromagnetic radiation. A gas cell 10, having walls 12 that are transparent to preselected wavelengths of electromagnetic radiation, contains a Raman scattering medium 14. The Raman scattering medium 14 is maintained in the gas cell 10 in a gaseous state. A lamp means 16, having transparent tube member 18, is adapted to emit electromagnetic radiation 20 from a vaporizable substance 22 contained within the tube means 18. Thus, for example, the lamp 16 may be a sodium vapor lamp, mercury vapor lamp, or the like, and the substance 22 contained within the tube means 18 is induced to emit the electromagnetic radiation 20 by the influence of a high frequency magnetic field generated by coil means 24 which is powered by signal generator 26. A reflector means 28 directs the electromagnetic radiation 20 emitted from the lamp means 16 to traverse the Raman scattering medium 14 in a preselected direction. Associated with the lamp 16 is a filter means 30 which is adapted to transmit substantially only energy concentrated in a single frequency. Thus, if lamp 16 is a sodium vapor lamp, the filter 30 may be adapted to transmit filtered electromagnetic radiation 21 in the prominent sodium line at $5.09 \times 10^{14}$ cycles per second; similarly, if the lamp 16 were a mercury vapor lamp, the filter 30 may be adapted to transmit as filtered electromagnetic radiation 21 substantially only energy concentrated at $6.86 \times 10^{14}$ cycles per second. A collimator 32 is positioned to collimate the filtered electromagnetic radiation 21 to provide collimated electromagnetic radiation 23, and a polarizer 34 is positioned to polarize the collimated electromagnetic radiation 23 to provide polarized electromagnetic radiation 25. Applicant has found that polarizing, which, for example, may be circular or plane polarization, aids the efficiency of operation of this system and, in the preferred embodiment of this invention, the polarizer is included. However, satisfactory operation is also obtainable without utilizing the polarizer 34. In the arrangement shown on FIGURE 1, the polarized electromagnetic radiation 25 traverses the Raman scattering medium 14 in a preselected direction.

A cooling jacket 36 is provided adjacent the gas cell 10 and a coolant 38, such as water, is pumped by pump means 40 from reservoir 42 through the cooling jacket 36 to maintain the Raman scattering medium 14 at a preselected temperature.

Electromagnetic radiation 44 is emitted from the Raman scattering medium 14 and a detection filter 46 is provided to receive the emitted electromagnetic radiation 44 and transmits substantially only energy concentrated in a preselected frequency 48. A detector 50 is positioned to receive the preselected frequency 48 and to generate a signal responsive to variations in the intensity of the preselected frequency 48. This signal may be amplified by amplifier 52 to provide an information signal at output terminals 54 having an information content, such as magnitude, proportional to variations in the intensity of the preselected frequency 48.

In operation, this arrangement is utilized to measure the intensity of a preselected frequency of, for example, infrared radiation. This preselected frequency of electromagnetic radiation is contained within an incident beam of infrared radiation 56 which traverses the Raman scattering medium 14. The Raman scattering medium 14 is selected so that the frequency associated with the energy separation between a ground quantum energy state of the molecules comprising the Raman scattering medium 14 and an excited state, which for example may be the first excited state, corresponds to the preselected frequency of infrared radiation within the incident beam 56 whose intensity is to be measured. This is termed a sharp line quantum energy transition.

The beam 56 may traverse the Raman scattering medium 14 in any arbitrary direction. In traversing the Raman scattering medium 14, the preselected frequency of infrared radiation impinges on the molecules comprising the Raman scattering medium 14. Energy is transferred from the photons associated with the preselected frequency of infrared radiation to the molecules to establish, at least intermittently, a greater population of molecules in the first excited state than is normally obtained under thermal equilibrium conditions. Thus, the preselected frequency of infrared radiation increases the number of molecules at the first excited state and decreases the number of molecules at the ground quantum energy state.

When the polarized electromagnetic radiation 25 traverses the Raman scattering medium 14, there are three main types of interactions that may take place between the photons associated with the polarized electromagnetic radiation 25 and the molecules comprising the Raman scattering medium 14. There may be an inelastic scattering as the photons associated with the polarized electromagnetic radiation 25 impinge upon the molecules of the Raman scattering medium 14, in which case electromagnetic radiation 20' at substantially the same frequency as polarized electromagnetic radiation 25 is emitted from the Raman scattering medium.

Figure 2:
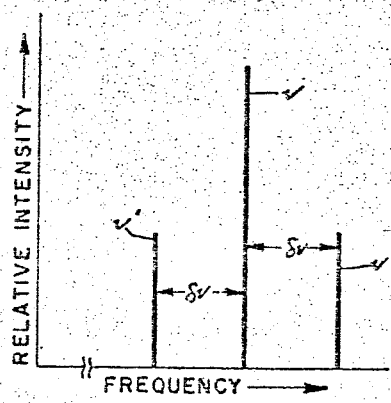
FIGURE 2 is a schematic illustration of electromagnetic radiation emitted from the Raman scattering medium of FIGURE 1.

Another type of interaction may occur when the photons associated with the polarized electromagnetic radiation 25 undergo inelastic collisions with the molecules comprising the Raman scattering medium 14. If these photons impinge upon a molecule of the Raman scattering medium 14 that is initially in the ground quantum energy state, energy is transferred from the photon to the molecule and the molecule is raised to the first excited state. For this type of interaction, a photon is re-emitted at a slightly lower frequency than the frequency of the polarized electromagnetic radiation 25 and this frequency is termed the Stokes line. The difference between the Stokes frequency and the polarized electromagnetic radiation 25 frequency corresponds to the frequency difference between the ground quantum energy state and the first excited state of the molecule which, as described above, is the infrared frequency whose intensity is to be measured. FIGURE 2 shows this relationship. The line $v$ is the frequency of the polarized electromagnetic radiation 25 which, for example, may be the sodium line at $5.09 \times 10^{14}$ cycles per second. For example, if the frequency of infrared radiation whose intensity is to be measured is $6.67 \times 10^{13}$ cycles per second, gaseous $N_2O$ may be selected as the Raman scattering medium. $N_2O$ has a frequency associated with the energy separation between the molecules at its ground quantum energy state and the molecules at its first excited state corresponding to $6.67 \times 10^{13}$ cycles per second. Thus, the frequency of the Stokes line $v'$ is separated from the sodium frequency $v$ by an amount $\delta v = 6.67 \times 10^{13}$ cycles per second and therefore has an absolute value of $4.42 \times 10^{14}$ cycles per second. The relative intensity of the frequency $v$ is very much greater than the Stokes frequency $v'$ due to a lower probability of the inelastic collisions that give rise to the Stokes frequency $v'$.

Another type of collision may take place between the photons associated with polarized electromagnetic radiation 25 and the molecules of the Raman scattering medium 14 at a first excited quantum energy state. This type collision and the associated emission of electromagnetic radiation may be termed an exothermic virtual absorption. This occurs when these photons impinge upon a molecule that is at the first excited state. In this interaction there is a virtual absorption of the impinging photon by the molecule at the first excited state which results in a virtual change in the rotation or vibration energy of the molecule. Associated with this virtual absorption there is a collapse of the molecule to the ground state and in this transition, from the first excited state down to the ground quantum energy state, there is an emission of electromagnetic radiation and the frequency of this emitted electromagnetic radiation is equivalent to the frequency of the impinging electromagnetic radiation plus the frequency associated with the energy difference between the first excited state and the ground quantum energy state. This is termed the anti-Stokes line and is indicated on FIGURE 2 as the line $v''$. The frequency difference between the frequency $v$ and the anti-Stokes line $v''$ is also $\delta v = 6.67 \times 10^{13}$ cycles per second (for the above example) and, thus, the absolute value of the anti-Stokes line is $5.757 \times 10^{14}$ cycles per second.

Under thermal equilibrium conditions at, for example, 25° C., there is normally very few molecules of $N_2O$ at the first excited state and therefore a very low probability of virtual absorption. Thus, the anti-Stokes line associated with the frequency $v$ is normally very faint. However, under the influence of the incident infrared radiation 56 which, as noted above, contains energy in a frequency corresponding to the energy difference between the ground quantum energy state and the first excited state, the population of molecules at the first excited state is very greatly enhanced in proportion to the intensity or number of photons at this preselected frequency of infrared radiation. Consequently, the intensity of the anti-Stokes line is proportionately increased.

The detection filter 46 of FIGURE 1 is adapted to transmit as the preselected frequency 48 energy, corresponding to the anti-Stokes line, and the detector 50 is adapted to measure changes in the intensity of the anti-Stokes line and generates a signal having a magnitude proportional thereto. Thus, when the frequency $v$ is in the visible portion of the electromagnetic radiation spectrum, such as the sodium frequency at $5.09 \times 10^{14}$ cycles per second, the detector 50 may be a comparatively high efficiency type detector such as a photoelectric cell or solar cell and, therefore, more energy per photon in the preselected frequency 48 is available to the detector 50 than if infrared type detectors were utilized to measure the intensity of the incident infrared frequency directly.

The most important competing mechanism in the arrangement, shown on FIGURE 1, that tends to reduce the signal to noise ratio is the thermal relaxation of the molecules caused by molecular interactions. One method of minimizing the thermal relaxation is by maintaining the Raman scattering medium 14 at a preselected temperature that reduces the probability of molecular interactions. As shown on FIGURE 1, this may be accomplished by circulating a cooling medium 38 to cool the Raman scattering medium 14 and maintain it at the preselected temperature.

Figure 1A:
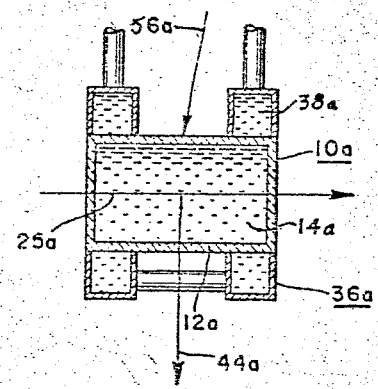

Applicant has found that Raman scattering medium other than gases may also be utilized in the practice of this invention. Thus, for example as shown on FIGURE 1a, a Raman scattering medium 14a that is in the liquid state is contained within a sealed liquid container 10a that has walls 12a transparent to preselected frequencies of electromagnetic radiation. Electromagnetic radiation 56a, containing energy in a preselected frequency, is incident upon the Raman scattering medium 14a and a beam of polarized and collimated monochromatic radiation 25a traverses the medium 14a in a preselected direction. Operation of this embodiment is similar to that described in connection with the embodiment of FIGURE 1 and electromagnetic radiation 44a containing energy in a frequency corresponding to an anti-Stokes frequency associated with the monochromatic radiation 25a is emitted from the liquid Raman scattering medium 14a. Measurement of the intensity of this anti-Stokes frequency provides a signal having a magnitude proportional to the intensity of the preselected frequency contained in the incident electromagnetic radiation 56a, as described above.

Figure 1B:
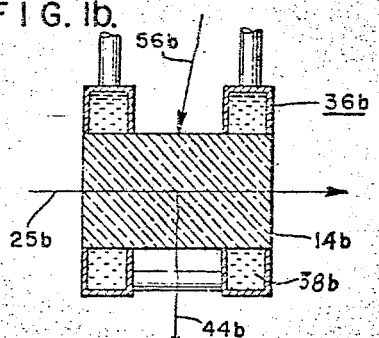

Solid Raman scattering media may also be utilized in the practice of this invention: such an embodiment is shown on FIGURE 1b. Electromagnetic radiation 56b, containing energy in a preselected frequency, is incident upon a solid Raman scattering medium 14b. A beam of polarized and collimated monochromatic radiation 25b traverses the solid Raman scattering medium 14b in a preselected direction. As a result, electromagnetic radiation 44b, containing energy in an anti-Stokes frequency associated with the monochromatic radiation 25b, is emitted from the solid Raman scattering medium 14b. As described above, detection of this anti-Stokes frequency and measurement of the intensity thereof provides an information signal having a magnitude proportional to the preselected frequency contained with the electromagnetic radiation 56b. Table I below lists a few of the gaseous and liquid Raman scattering media having a sharp line quantum energy transition which may be utilized in the practice of this invention to measure the intensity of a preselected frequency of electromagnetic radiation.

TABLE I

*Raman scattering media having sharp line quantum energy transition*

|   | State | Raman Scattering Medium |
|---|---|---|
| 1 | Gas | $N_2O$. |
| 2 | Gas | $H_2O$ (vapor). |
| 3 | Gas | HDO (vapor). |
| 4 | Gas | $NH_3$. |
| 5 | Gas | $ND_3$. |
| 6 | Liquid | $NH_3 + H_2O$. |
| 7 | Liquid | $CS_2 + H_2O$. |
| 8 | Liquid | $CCl_4 + H_2O$. |

Applicant has also found that the intensity of a preselected bandwidth of, for example, infrared radiation may also be detected in the practice of his invention. In such an arrangement, a Raman scattering medium is selected that has a band quantum energy transition and the detection filter 46 of FIGURE 1 is adapted to transmit energy in a preselected frequency bandwidth rather than a single frequency. The operation of arrangements to measure the intensity of a preselected bandwidth of incident infrared radiation is substantially the same as that described in connection with the embodiments of FIGURES 1, 1a and 1b.

Figure 3:
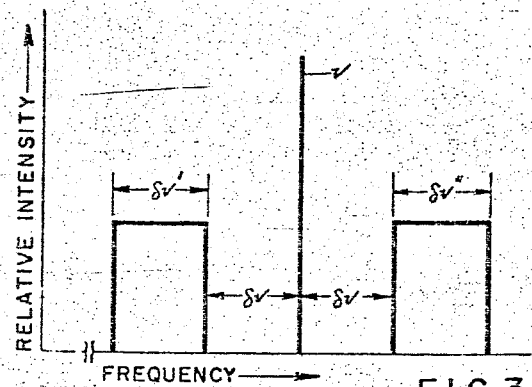
FIGURE 3 is a schematic illustration of electromagnetic radiation emitted from another Raman scattering medium.

FIGURE 3 is a diagram, similar to FIGURE 2, for a Raman scattering medium 14 having a band quantum energy transition. The molecules associated with this Raman scattering medium have a plurality of closely adjacent first excited states, termed substates, that differ only very slightly in the absolute value of the frequency associated with the transitions from the ground state. Thus, incident infrared radiation 56 containing energy in the preselected infrared bandwidth induces an overpopulation of a plurality of first excited states. A virtual absorption between these molecules at the first excited substates results in an emission of electromagnetic radiation in an anti-Stokes bandwidth, indicated on FIGURE 3 by $\delta v''$. The frequency difference $\delta v$ between the frequency of the polarized electromagnetic radiation 25 and any individual frequency within the bandwidth $\delta v''$ corresponds to the frequency associated with the transition between a first excited substate and the ground quantum energy state. Thus, the detection filter 46 transmits a preselected frequency bandwidth corresponding to $\delta v''$ and the detector 50 detects changes in the intensity thereof.

Applicant has also found that there are liquid and solid Raman scattering media as well as gaseous Raman scattering media that may be utilized to detect a bandwidth of incident infrared radiation. A few of these media are listed below in Table II. In addition, the liquids of most of the gases listed in Table I also have band quantum energy transitions.

TABLE II

*Raman scattering media having band quantum energy transition*

| | State | Raman Scattering Medium |
|---|---|---|
| 1 | Gas | $N_2O$* |
| 2 | Gas | $H_2O$* |
| 3 | Gas | $HDO$* |
| 4 | Gas | $NH_3$* |
| 5 | Gas | $ND_3$* |
| 6 | Gas | $BF_3$ |
| 7 | Gas | $H_2CO$ |
| 8 | Liquid | $SO_2$ |
| 9 | Liquid | $CO_2$ |
| 10 | Liquid | $CCl_4$ |
| 11 | Solid | $C_2H_6$ |
| 12 | Solid | $CaCO_3$ |

*At pressures over 10 atmospheres.

This invention will also operate without utilization of the filter 30 of FIGURE 1. In such a case, the beam of electromagnetic radiation that traverses the Raman scattering medium is not substantially monochromatic, as described above, but contains several frequencies of electromagnetic radiation. In such a situation, the intensity of the anti-Stokes line associated with any one frequency in the traversing electromagnetic radiation is reduced because of the numerous similar interactions with the photons at other frequencies. This somewhat reduces the signal to a noise ratio available in the information signal at the terminals 54.

In the preferred embodiment of this invention, the detection filter 46 and detector 50 are positioned to intercept electromagnetic radiation 44 that is emitted from the Raman scatering medium 14 in a direction substantially perpendicular to the direction of the polarized electromagnetic radiation 25 as this tends to increase the sensitivity of the detection. However, other directional arrangements of the detection filter 46 and detector 50 may be utilized.

Those skilled in the art will find many variations and adaptations of applicant's invention. For example, the Raman scattering effect described above is known to extend well into the X-ray region and, therefore, applicant's invention may be utilized to detect the intensity of frequencies other than infrared. Therefore, it is intended that the description of the embodiments herein presented be considered as illustrative only and the appended claims are intended to cover all adaptations and modifications that do not depart from the true scope and spirit of applicant's invention.

What is claimed as new and is desired to be secured by Letters Patent of the United States is:

1. In combination: a Raman scattering medium having a first quantum energy level and a second quantum energy level higher than said first quantum energy level; wall means coupled to said Raman scattering medium for receiving incident electromagnetic radiation having energy in at least one frequency corresponding to the energy separation between said first and said second quantum energy levels of said Raman scattering medium; said wall means associated with said Raman scattering medium causing said incident electromagnetic radiation to traverse said Raman scattering medium; lamp means for generating a beam of electromagnetic radiation; filter means coupled to said lamp means for filtering said electromagnetic radiation to transmit substantially only energy concentrated in a preselected frequency; collimating means coupled to said filter means for collimating said filtered beam of electromagnetic radiation; polarizing means coupled to said collimating means for polarizing said collimated beam of electromagnetic radiation; means for directing said polarized beam of electromagnetic radiation to traverse said Raman scattering medium in a preselected direction; cooling means coupled to said Raman scattering medium for maintaining said Raman scattering medium at a preselected temperature; detection filter means connected to said Raman scattering medium to filter electromagnetic radiation emitted from said Raman scattering medium in a direction substantially perpendicular to said preselected direction to transmit substantially only energy concentrated in a frequency corresponding to the anti-Stokes frequency of said preselected frequency; detection means coupled to said detection filter means for selectively detecting the intensity of said anti-Stokes frequency; and signal generating means coupled to said detection means for generating a signal having a magnitude proportional to the intensity of said detected anti-Stokes frequency.

2. The arrangement defined in claim 1, wherein said polarizing means circularly polarizes said collimated beam of electromagnetic radiation.

3. The arrangement defined in claim 1, wherein said polarizing means plane polarizes said collimated beam of electromagnetic radiation.

4. In combination: a Raman scattering medium having a first quantum energy level and a second quantum energy level higher than said first quantum energy level; wall means coupled to said Raman scattering medium for receiving incident electromagnetic radiation having energy in at least one frequency corresponding to the energy separation between said first and said second quantum energy levels of said Raman scattering medium; said wall means associated with said Raman scattering medium causing said incident electromagnetic radiation to traverse said Raman scattering medium; lamp means for generating a beam of electromagnetic radiation; filter means coupled to said lamp means for filtering said electromagnetic radiation to transmit substantially only energy concentrated in a preselected frequency; collimating means coupled to said filter means for collimating said filtered beam of electromagnetic radiation; means for directing said collimating beam of electromagnetic radiation to traverse said Raman scattering medium in a preselected direction; detection filter means connected to said Raman scattering medium to filter electromagnetic radiation emitted from said Raman scattering medium in a direction substantially perpendicular to said preselected direction to transmit substantially only energy concentrated in a frequency corresponding to the anti-Stokes frequency of said preselected frequency; and detection means coupled to said detection filter means for selectively detecting the intensity of said anti-Stokes frequency.

5. The arrangement defined in claim 4, wherein said preselected frequency is in the visible portion of the electromagnetic spectrum.

6. In combination: a Raman scattering medium having a first quantum energy level and a second quantum energy level higher than said first quantum energy level; wall means coupled to said Raman scattering medium for receiving incident electromagnetic radiation having energy in at least one frequency corresponding to the energy separation between said first and said second quantum energy levels of said Raman scattering medium; said wall means associated with said Raman scattering medium causing said incident electromagnetic radiation to traverse said Raman scattering medium; means for generating a substantially monochromatic, collimated beam of electromagnetic radiation in a beam traversing said Raman scattering medium in a preselected direction; detection means disposed in a radiation receivable relationship with respect to said Raman scattering medium for selectively detecting the intensity of at least one preselected anti-Stokes frequency of electromagnetic radiation emitted from said Raman scattering medium; and signal generating means coupled to said detection means for generating an information signal having an information content proportional to said detected intensity of said preselected anti-Stokes frequency of electromagnetic radiation.

7. The arrangement defined in claim 6, wherein said Raman scattering medium is a fluid.

8. The arrangement defined in claim 6, wherein said Raman scattering medium is a gas.

9. The arrangement defined in claim 6, wherein said Raman scattering medium is a liquid.

10. The arrangement defined in claim 6, wherein said Raman scattering medium is a solid.

11. In combination: a Raman scattering medium comprising a plurality of molecules and at least a first part of said molecules at a first quantum energy state and a second part of said molecules at a second quantum energy state higher than said first quantum energy state; wall means coupled to said Raman scattering medium for receiving incident electromagnetic radiation having energy in at least one frequency corresponding to the separation between said first quantum energy state and said second quantum energy state; said wall means associated with said Raman scattering medium causing said incident electromagnetic radiation to traverse said Raman scattering medium; means for generating a beam of electromagnetic radiation containing energy in a preselected frequency; means for inducing a virtual absorption of at least a part of said preselected frequency by said second part of said molecules; and means disposed in radiation receivable relationship with respect to said Raman scattering medium for selectively detecting the intensity of electromagnetic radiation having a frequency corresponding to the anti-Stokes frequency associated with said preselected frequency of electromagnetic radiation emitted from said Raman scattering medium.

12. In combination: a gas cell having walls defining a cavity and said walls transparent to preselected wavelengths of electromagnetic radiation; a Raman scattering medium in the gaseous state contained within the cavity and said Raman scattering medium having a sharp line quantum energy transition between a first quantum energy state and a second quantum energy state higher than said first quantum energy state and the frequency associated with said sharp line quantum energy transition corresponds to a frequency in the infrared portion of the electromagnetic radiation spectrum; wall means for receiving incident electromagnetic radiation having energy in at least one frequency corresponding to the separation between said first quantum energy state and said second quantum energy state; said wall means associated with said Raman scattering medium causing said incident electromagnetic radiation to traverse said Raman scattering medium; lamp means for generating a beam of electromagnetic radiation; filter means coupled to said lamp means for filtering said electromagnetic radiation to transmit substantially only energy concentrated in a preselected frequency in the visible portion of the electromagnetic radiation spectrum; collimating means coupled to said filter means for collimating said filtered beam of electromagnetic radiation; polarizing means coupled to said collimating means for polarizing said collimated beam of electromagnetic radiation; means for directing said polarized beam of electromagnetic radiation to traverse said Raman scattering medium in a preselected direction; cooling means coupled to said Raman scattering medium for maintaining said Raman scattering medium at a preselected temperature; detection filter means connected to said Raman scattering medium to filter electromagnetic radiation emitted from said Raman scattering medium in a direction substantially perpendicular to said preselected direction to transmit substantially only energy concentrated in a frequency corresponding to the anti-Stokes frequency of said preselected frequency; detection means coupled to said detection filter means for selectively detecting the intensity of said anti-Stokes frequency; and signal generating means coupled to said detection means for generating a signal having a magnitude proportional to the intensity of said detected anti-Stokes frequency, whereby irradiation of said Raman scattering medium by electromagnetic radiation having energy in a frequency corresponding to said sharp line quantum energy transition increases the intensity of said anti-Stokes line.

13. In combination: a gas cell having walls defining a cavity and said walls transparent to preselected wavelengths of electromagnetic radiation; a Raman scattering medium in the gaseous state contained within the cavity and said Raman scattering medium having a sharp line quantum energy transition between a first quantum energy state and a second quantum energy state higher than said first quantum energy state; walls means for receiving incident electromagnetic radiation having energy in at least one frequency corresponding to the separation between said first quantum energy state and said second quantum energy state; said wall means associated with said Raman scattering medium causing said incident electromagnetic radiation to traverse said Raman scattering medium; lamp means for generating a beam of electromagnetic radiation; filter means coupled to said lamp means for filtering said electromagnetic radiation to transmit substantially only energy concentrated in a preselected frequency; collimating means coupled to said filter means for collimating said filtered beam of electromagnetic radiation; means for directing said collimated beam of electromagnetic radiation to traverse said Raman scattering medium in a preselcted direction; detection filter means connected to said Raman scattering medium to filter electromagnetic radiation emitted from said Raman scattering medium in a direction substantially perpendicular to said preselected direction to transmit substantially only energy concentrated in a frequency corresponding to the anti-Stokes frequency of said preselected frequency; and detection means coupled to said detection filter means for selectively detecting the intensity of said anti-Stokes frequency.

14. In combination: a gas cell having walls defining a cavity and said walls transparent to preselected wavelengths of electromagnetic radiation; a Raman scattering medium in the gaseous state contained within the cavity and said Raman scattering medium having a band quantrum energy transition between a first quantrum energy state and a second quantum energy state higher than said first quantum energy state and the frequencies associated with said band quantum energy transition corresponds to an infrared frequency band; wall means for receiving incident electromagnetic radiation having energy in a frequency band corresponding to said band energy transition between said first and said second quantum energy states of said Raman scattering medium; said wall means causing said incident electromagnetic radiation to traverse said Raman scattering medium; lamp means for generating a beam of electromagnetic radiation; filter means coupled to said lamp means for filtering said electromagnetic radiation to transmit substantially only energy concentrated in a preselected visible frequency; collimating means coupled to said filter means for collimating said filtered beam of electromagnetic radiation; polarizing means coupled to said collimating means for polarizing said collimated beam of electromagnetic radiation; means for directing said polarized beam of electromagnetic radiation to traverse said Raman scattering medium in a preselected direction; cooling means coupled to said Raman scattering medium for maintaining said Raman scattering medium at a preselected temperature; detection filter means connected to said Raman scattering medium to filter electromagnetic radiation emitted from said Raman scattering medium in a direction substantially perpendicular to said preselected direction to transmit substantially only energy concentrated in a frequency corresponding to the anti-Stokes frequency of said preselected frequency; detection means coupled to said detection filter means for selectively detecting the intensity of said anti-Stokes frequency; and signal generating means coupled to said detection means for generating a signal having a magnitude proportional to the intensity of said detected anti- Stokes frequency, whereby irradiation of said Raman scattering medium by electromagnetic radiation having energy in a frequency bandwidth corresponding to said band quantum energy transition increases the intensity of said anti-Stokes line.

15. In combination: a gas cell having walls defining a cavity and said walls transparent to preselected wavelengths of electromagnetic radiation; a Raman scattering medium in the gaseous state contained within the cavity and said Raman scattering medium having a band quantum energy transition between a first quantum energy state and a second quantum energy state higher than said first quantum energy state; wall means for receiving incident electromagnetic radiation having energy in a frequency band corresponding to said band energy transition between said first and said second quantum energy states of said Raman scattering medium; said wall means causing said incident electromagnetic radiation to traverse said Raman scattering medium; lamp means for generating a beam of electromagnetic radiation; filter means coupled to said lamp means for filtering said electromagnetic radiation to transmit substantially only energy concentrated in a preselected frequency; collimating means coupled to said filter means for collimating said filtered beam of electromagnetic radiation; means for directing said collimated beam of electromagnetic radiation to traverse said Raman scattering medium in a preselected direction; detection filter means connected to said Raman scattering medium to filter electromagnetic radiation emitted from said Raman scattering medium in a direction substantially perpendicular to said preselected direction to transmit substantially only energy concentrated in a frequency corresponding to the anti-Stokes frequency of said preselected frequency; and detection means coupled to said detection filter means for selectively detecting the intensity of said anti-Stokes frequency.

16. In combination: a sealed container means having walls defining a cavity and said walls transparent to preselected wavelengths of electromagnetic radiation; a Raman scattering medium in the liquid state contained within said cavity and said Raman scattering medium having a sharp line quantum energy transition between a first quantum energy state and a second quantum energy state higher than said first quantum energy state and said sharp line quantum energy transition corresponds to an infrared frequency; wall means for receiving incident electromagnetic radiation having energy in at least one frequency corresponding to the separation between said first quantum energy state and said second quantum energy state; said wall means associated with said Raman scattering medium causing said incident electromagnetic radiation to traverse said Raman scattering medium; lamp means for generating a beam of electromagnetic radiation; filter means coupled to said lamp means for filtering said electromagnetic radiation to transmit substantially only energy concentrated in a preselected visible frequency; collimating means coupled to said filter means for collimating said filtered beam of electromagnetic radiation; polarizing means coupled to said collimating means for polarizing said collimated beam of electromagnetic radiation; means for directing said polarized beam of electromagnetic radiation to traverse said Raman scattering medium in a preselected direction; cooling means coupled to said Raman scattering medium for maintaining said Raman scattering medium at a preselected temperature; detection filter means connected to said Raman scattering medium to filter electromagnetic radiation emitted from said Raman scattering medium in a direction substantially perpendicular to said preselected direction to transmit substantially only energy concentrated in a frequency corresponding to the anti-Stokes frequency of said preselected frequency; detection means coupled to said detection filter means for selectively detecting the intensity of said anti-Stokes frequency; and signal generating means coupled to said detection means for generating a signal having a magnitude proportional to the intensity of said detected anti-Stokes frequency, whereby irradiation of said Raman scattering medium by electromagnetic radiation having energy in a frequency corresponding to said sharp line quantum energy transition increases the intensity of said anti-Stokes line.

17. In combination: a sealed container means having walls defining a cavity and said walls transparent to preselected wavelengths of electromagnetic radiation; a Raman scattering medium in the liquid state contained within said cavity and said Raman scattering medium having a sharp line quantum energy transition between a first quantum energy state and a second quantum energy state higher than said first quantum energy state; wall means for receiving incident electromagnetic radiation having energy in at least one frequency corresponding to the separation between said first quantum energy state and said second quantum energy state; said wall means associated with said Raman scattering medium causing said incident electromagnetic radiation to traverse said Raman scattering medium; lamp means for generating a beam of electromagnetic radiation; filter means coupled to said lamp means for filtering said electromagnetic radiation to transmit substantially only energy concentrated in a preselected frequency; collimating means coupled to said filter means for collimating said filtered beam of electromagnetic radiation; means for directing said collimated beam of electromagnetic radiation to traverse said Raman scattering medium in a preselected direction; detection filter means connected to said Raman scattering medium to filter electromagnetic radiation emitted from said Raman scattering medium in a direction substantially perpendicular to said preselected direction to transmit substantially only energy concentrated in a frequency corresponding to the anti-Stokes frequency of said preselected frequency; and detection means coupled to said detection filter means for selectively detecting the intensity of said anti-Stokes frequency.

18. In combination: a sealed container means having walls defining a cavity and said walls transparent to preselected wavelengths of electromagnetic radiation; a Raman scattering medium in the liquid state contained within said cavity and said Raman scattering medium having a band quantum energy transition corresponding to a frequency band in the infrared portion of the electromagnetic radiation spectrum between a first quantum energy state and a second quantum energy state higher than said first quantum energy state; wall means for receiving incident electromagnetic radiation having energy in a frequency band corresponding to said band energy transition between said first and said second quantum energy states of said Raman scattering medium; said wall means causing said incident electromagnetic radiation to traverse said Raman scattering medium; lamp means for generating a beam of electromagnetic radiation; filter means coupled to said lamp means for filtering said electromagnetic radiation to transmit substantially only energy concentrated in a preselected visible frequency; collimating means coupled to said filter means for collimating said filtered beam of electromagnetic radiation; polarizing means coupled to said collimating means for polarizing said collimated beam of electromagnetic radiation; means for directing said polarized beam of electromagnetic radiation to traverse said Raman scattering medium in a preselected direction; cooling means coupled to said Raman scattering medium for maintaining said Raman scattering medium at a preselected temperature; detection filter means connected to said Raman scattering medium to filter electromagnetic radiation emitted from said Raman scattering medium in a direction substantially perpendicular to said preselected direction to transmit substantially only energy concentrated in a frequency corresponding to the anti-Stokes frequency of said preselected frequency; detection means coupled to said detection filter means for selectively detecting the intensity of said anti-Stokes frequency; and signal generating means coupled to said detection means for generating a signal having a magnitude proportional to the intensity of said detected anti-Stokes frequency, whereby irradiation of said Raman scattering medium by electromagnetic radiation having energy in a frequency bandwidth corresponding to said band quantum energy transition increases the intensity of said anti-Stokes line.

19. In combination: a sealed container means having walls defining a cavity and said walls transparent to preselected wavelengths of electromagnetic radiation; a Raman scattering medium in the liquid state contained within said cavity and said Raman scattering medium having a band quantum energy transition between a first quantum energy state and a second quantum energy state higher than said first quantum energy state; wall means for receiving incident electromagnetic radiation having energy in a frequency band corresponding to said band energy transition between said first and said second quantum energy states of said Raman scattering medium; said wall means causing said incident electromagnetic radiation to traverse said Raman scattering medium; lamp means for generating a beam of electromagnetic radiation; filter means coupled to said lamp means for filtering said electromagnetic radiation to transmit substantially only energy concentrated in a preselected frequency; collimating means coupled to said filter means for collimating said filtered beam of electromagnetic radiation; means for directing said collimated beam of electromagnetic radiation to traverse said Raman scattering medium in a preselected direction; detection filter means connected to said Raman scattering medium to filter electromagnetic radiation emitted from said Raman scattering medium in a direction substantially perpendicular to said preselected direction to transmit substantially only energy concentrated in a frequency corresponding to the anti-Stokes frequency of said preselected frequency; and detection means coupled to said detection filter means for selectively detecting the intensity of said anti-Stokes frequency.

20. In combination: a Raman scattering medium in the solid state having a sharp line quantum energy transition corresponding to an infrared frequency between a first quantum energy state and a second quantum energy state higher than said first quantum energy state; wall means for receiving incident electromagnetic radiation having energy in at least one frequency corresponding to the separation between said first quantum energy state and said second quantum energy state; said wall means associated with said Raman scattering medium causing said incident electromagnetic radiation to traverse said Raman scattering medium; lamp means for generating a beam of electromagnetic radiation; filter means coupled to said lamp means for filtering said electromagnetic radiation to transmit substantially only energy concentrated in a preselected visible frequency; collimating means coupled to said filter means for collimating said filtered beam of electromagnetic radiation; polarizing means coupled to said collimating means for polarizing said collimated beam of electromagnetic radiation; means for directing said polarized beam of electromagnetic radiation to traverse said Raman scattering medium in a preselected direction; cooling means coupled to said Raman scattering medium for maintaining said Raman scattering medium at a preselected temperature; detection filter means connected to said Raman scattering medium to filter electromagnetic radiation emitted from said Raman scattering medium in a direction substantially perpendicular to said preselected direction to transmit substantially only energy concentrated in a frequency corresponding to the anti-Stokes frequency of said preselected frequency; detection means coupled to said detection filter means for selectively detecting the intensity of said anti-Stokes frequency; and signal generating means coupled to said detection means for generating a signal having a magnitude proportional to the intensity of said detected anti-Stokes frequency, whereby irradiation of said Raman scattering medium by electromagnetic radiation having energy in a frequency corresponding to said sharp line quantum energy transition increases the intensity of said anti-Stokes line.

21. In combination: a Raman scattering medium in the solid state having a sharp line quantum energy transition between a first quantum energy state and a second quantum energy state higher than said first quantum energy state; wall means for receiving incident electromagnetic radiation having energy in at least one frequency corresponding to the separation between said first quantum energy state and said second quantum energy state; said wall means associated with said Raman scattering medium causing said incident electromagnetic radiation to traverse said Raman scattering medium; lamp means for generating a beam of electromagnetic radiation; filter means coupled to said lamp means for filtering said electromagnetic radiation to transmit substantially only energy concentrated in a preselected frequency; collimating means coupled to said filter means for collimating said filtered beam of electromagnetic radiation; means for directing said collimated beam of electromagnetic radiation to traverse said Raman scattering medium in a preselected direction, detection filter means connected to said Raman scattering medium to filter electromagnetic radiation emitted from said Raman scattering medium in a direction substantially perpendicular to said preselected direction to transmit substantially only energy concentrated in a frequency corresponding to the anti-Stokes frequency of said preselected frequency; and detection means coupled to said detection filter means for selectively detecting the intensity of said anti-Stokes frequency.

22. In combination: a Raman scattering medium in the solid state having a band quantum energy transition corresponding to an infrared frequency band between a first quantum energy state and a second quantum energy state higher than said first quantum energy state; wall means for receiving incident electromagnetic radiation having energy in a frequency band corresponding to said band energy transition between said first and said second quantum energy states of said Raman scattering medium; said wall means causing said incident electromagnetic radiation to traverse said Raman scattering medium; lamp means for generating a beam of electromagnetic radiation; filter means coupled to said lamp means for filtering said electromagnetic radiation to transmit substantially only energy concentrated in a preselected visible frequency; collimating means coupled to said filter means for collimating said filtered beam of electromagnetic radiation; polarizing means coupled to said collimating means for polarizing said collimated beam of electromagnetic radiation; means for directing said polarized beam of electromagnetic radiation to traverse said Raman scattering medium in a preselected direction; cooling means coupled to said Raman scattering medium for maintaining said Raman scattering medium at a preselected temperature; detection filter means connected to said Raman scattering medium to filter electromagnetic radiation emitted from said Raman scattering medium in a direction substantially perpendicular to said preselected direction to transmit substantially only energy concentrated in a frequency corresponding to the anti-Stokes frequency of said preselected frequency; detection means coupled to said detection filter means for selectively detecting the intensity of said anti-Stokes frequency; and signal generating means coupled to said detection means for generating a signal having a magnitude proportional to the intensity of said detected anti-Stokes frequency, whereby irradiation of said Raman scattering medium by electromagnetic radiation having energy in a frequency bandwidth corresponding to said band quantum energy transition increases the intensity of said anti-Stokes line.

23. In combination: a Raman scattering medium in the solid state having a band quantum energy transition between a first quantum energy state and a second quantum energy state higher than said first quantum energy state; wall means for receiving incident electromagnetic radiation having energy in a frequency band corresponding to said band energy transition between said first and said second quantum energy states of said Raman scattering medium; said wall means causing said incident electromagnetic radiation to traverse said Raman scattering medium; lamp means for generating a beam of electromagnetic radiation; filter means coupled to said lamp means for filtering said electromagnetic radiation to transmit substantially only energy concentrated in a preselected frequency; collimating means coupled to said filter means for collimating said filtered beam of electromagnetic radiation; means for directing said collimated beam of electromagnetic radiation to traverse said Raman scattering medium in a preselected direction; detection filter means connected to said Raman scattering medium to filter electromagnetic radiation emitted from said Raman scattering medium in a direction substantially perpendicular to said preselected direction to transmit substantially only energy concentrated in a frequency corresponding to the anti-Stokes frequency of said preselected frequency; and detection means coupled to said detection filter means for selectively detecting the intensity of said anti-Stokes frequency.

References Cited by the Examiner

UNITED STATES PATENTS

| | | | |
|---|---|---|---|
| 2,929,922 | 3/60 | Schawlow et al. | 250—211 X |
| 2,940,355 | 6/60 | Cary | 250—43.5 |
| 3,062,959 | 11/62 | Sclar | 250—83.3 |
| 3,070,698 | 12/62 | Bloembergen | 250—83.3 |

OTHER REFERENCES

Bell et al.: "Optical Detection of Magnetic Resonance in Alkali Metal Vapor," Physical Review, Sept. 15, 1957, pp. 1559 to 1565.

Hibben: The Raman Effect and Its Chemical Applications, Reinhold, 1939 (chapter 2 relied on).

Bloom: "Optical Pumping," Scientific American, October 1960.

Jelley: "Time Discrimination in Solid-State Infrared Quantum Counters," Journal of Applied Physics, July 1960, pp. 1145 and 1146.

Stoicheff: "High Resolution Raman Spectroscopy," published in Advances in Spectroscopy, Interscience Publishers, 1959.

RALPH G. NILSON, *Primary Examiner.*

RICHARD M. WOOD, ARCHIE R. BORCHELT,
*Examiners.*